United States Patent
Hayashi

[15] 3,642,382
[45] Feb. 15, 1972

[54] FAN ASSEMBLY

[72] Inventor: Masaharu Hayashi, Ichinomiya, Japan

[73] Assignee: Aisin Seiki Kabushiki Kaisha, Kariya, Aichi Pref., Japan

[22] Filed: May 5, 1970

[21] Appl. No.: 34,678

[30] Foreign Application Priority Data

May 11, 1969 Japan..................................44/42739

[52] U.S. Cl..................................416/169, 416/95, 416/241
[51] Int. Cl..................................F04d 29/34
[58] Field of Search.................416/171, 241, 169, 241 A, 95

[56] References Cited

UNITED STATES PATENTS

| | | |
|---|---|---|
| 2,041,507 | 5/1936 | Zeder..................................416/134 X |
| 2,948,268 | 8/1960 | Roper et al..........................123/41.11 |
| 2,986,250 | 5/1961 | Becker................................416/169 X |
| 3,260,312 | 7/1966 | Elmer..................................416/241 A X |
| 3,272,188 | 9/1966 | Sabat...................................123/41.11 |
| 3,522,795 | 8/1970 | Seifert.................................123/41.12 |

FOREIGN PATENTS OR APPLICATIONS 227,212 8/1943 Switzerland..........................416/207

Primary Examiner—Everette A. Powell, Jr.
Attorney—Pierce, Scheffler & Parker

[57] ABSTRACT

A fan assembly all made from a plastics material and combined to a fluid drive coupling for use in automobiles wherein a fitting member made from a metal material is provided between the drive coupling assembly and the fan thereby obstructing the heat flow from the coupling to the assembly.

6 Claims, 1 Drawing Figure

PATENTED FEB 15 1972
3,642,382
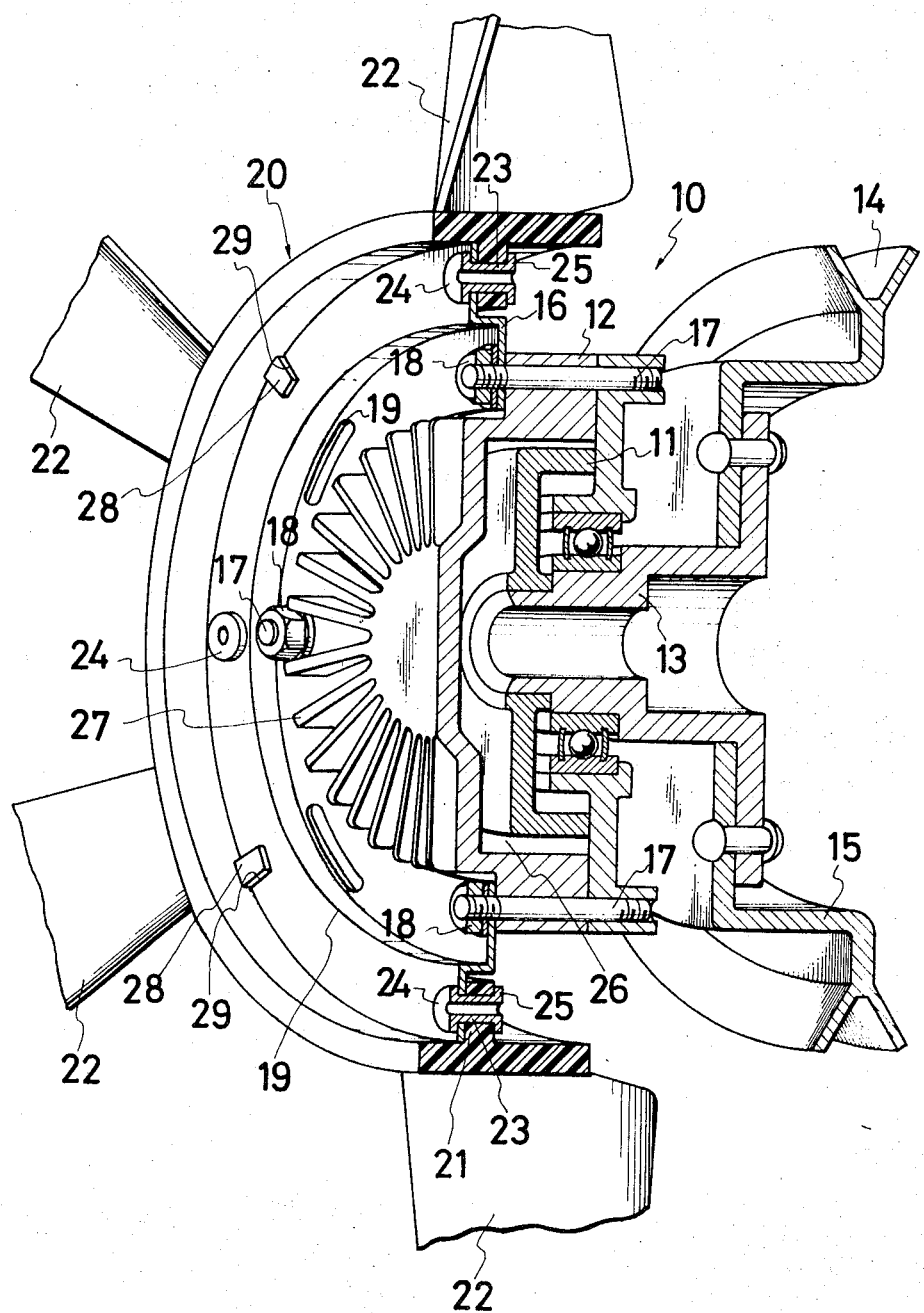
INVENTOR.
Masaharu Hayashi
BY
Pierce, Scheffler & Parker
Attorneys

FAN ASSEMBLY

The invention relates to cooling fan assemblies for use in automobiles to control the temperature of internal-combustion engines thereof. More particularly, the invention relates to the fan assembly wherein the fan hub and the fan blades are all made from a plastic material.

It is well known in the art to combine the fan assembly to a fluid drive coupling driven by a viscous fluid contained therein. But when the fan assembly is made from a plastic material, its hub portion is subject to overheating by the heat of the coupling due to the viscous shearing force so that the fan assembly, especially at its hub portion, is subject to deformation or melting.

The principal object of this invention is to overcome the above disadvantage in the prior art by providing a new and improved fan assembly wherein a circular fitting member made from a metal material is provided in the heat transmitting path from the fluid coupling assembly to the fan assembly so that little heat is transmitted to the fan assembly.

The accompanying drawing illustrates a fan assembly mounted on the output member of a fluid coupling, the tips of the fan blades not being shown.

Referring to the drawing, the fluid coupling assembly 10 is provided an input coupling member 11 and an output coupling member 12. The input coupling member 11 is mounted on an input shaft 13 which is driven by a V-belt (not shown). The V-belt is driven by an engine shaft (not shown) and passes around a V-shaped slot 14 of a pulley 15.

In the outer periphery of the output coupling member 12, there is attached a circular fitting member 16 made from a metal material. The fitting member 16 is fixed to the output coupling 12 by bolts 17 and nuts 18.

Some vent holes 19 are preferably provided in the fitting member 16 in a circular path to accomplish a cooling effect of the fitting member 16.

A fan assembly 20 is made from a plastics material and comprises a hub portion 21 and fan blades 22. Bushes 23 are passed through holes in the fitting member 16 and the fan hub 21 and are provided at the ends with a flange 24 and a flange 25. One outwardly extending flange 24 is formed before fitting of the bush 23 and the other outwardly extending flange 25 is formed after fitting thereof, whereby the fitting member 16 and the fan hub are secured to each other.

Between the output coupling member 12 and the input coupling member 11 there is formed a chamber 26. A viscous fluid such as a silicone oil is contained in the chamber 26 and experiences considerable viscous shearing forces when the input shaft 13 is driven. By virtue of these viscous shearing forces, rotational movement is transmitted to the output coupling member 12, the fitting member 16 fixed thereto, and the fastening bushes 23, thus causing the fan assembly 20 to be rotated. It should be noted that the temperature in the fluid working chamber 26 becomes high due to the shearing resistance of the fluid in spite of cooling fins 27 which are provided on the outer surfaces of the output coupling member 12.

On the hub portions 21, there are provided projections 28 which are fitted in openings 29 provided at the outer periphery of the fitting member 16, thereby transmitting the rotational movement from the fitting member 16 to the fan assembly 20 in cooperation with the fastening bushes 23.

According to the feature of the invention, heat flow from the output coupling member 12 to the fan assembly 20 is obstructed by the circular fitting member 16 which is caused to cool by virtue of the vent holes 19 so that the fan assembly 20 is not deformed, cracked nor melted due to the high heat of the fluid coupling assembly 10.

The fitting member 16 is fastened tight to the fan hub 21 by the bushes 23 and to the output coupling member 12 by the bolts 17 and the nuts 18 so that the rotational movement of the fluid coupling assembly 10 is positively transmitted to the fan assembly 20.

In addition, the fitting member 16 is engaged at its outer periphery with the projections 28 of the fan assembly 20 so that the rotation torque on the bushes 23 is diminished so as not to create torsion thereon.

I claim:

1. A fan assembly operatively connected to an output member of a fluid drive coupling driven by an engine, comprising a hub portion made of a plastic material, fan blades projecting radially from said hub portion and made of a plastic material and a substantially annular metal fitting member secured adjacent its outer periphery to said hub portion and adjacent its inner periphery to the output member of the fluid drive coupling, whereby heat from the output member is substantially prevented from passing to said hub portion.

2. A fan assembly as claimed in claim 1 wherein said fitting member is circular.

3. A fan assembly as claimed in claim 1, wherein said metal fitting member is provided with vent holes between the inner and outer peripheries thereof for aiding in radiation of heat from the output member before being transmitted to said hub portion.

4. A fan assembly as claimed in claim 1 wherein said hub portion is provided with projections for engaging openings provided in said fitting member to aid in transmitting torque therebetween.

5. A fan assembly as claimed in claim 1 and further comprising bushes for securing said fitting member to said hub portion, said bushes being provided with outwardly extending flanges at each end thereof.

6. A fan assembly as claimed in claim 1 wherein the inner periphery of said fitting member is provided with a plurality of bolt holes to secure said fitting member to the output member of the fluid drive coupling.

* * * * *